(No Model.) 8 Sheets—Sheet 1.

J. M. LAUGHLIN.
MACHINE FOR PREPARING AND FINISHING NAILS.

No. 521,242. Patented June 12, 1894.

(No Model.) 8 Sheets—Sheet 2.

J. M. LAUGHLIN.
MACHINE FOR PREPARING AND FINISHING NAILS.

No. 521,242. Patented June 12, 1894.

Witnesses:
L. M. Hackschlager
Fred C. Morse

Inventor
Joseph M. Laughlin,
By Briesen & Knauth
his Attorneys.

(No Model.) 8 Sheets—Sheet 3.
J. M. LAUGHLIN.
MACHINE FOR PREPARING AND FINISHING NAILS.
No. 521,242. Patented June 12, 1894.
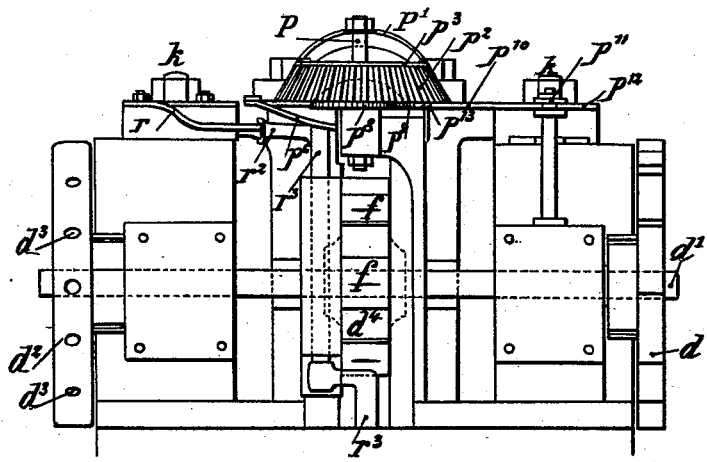
FIG. 3.
FIG. 5.
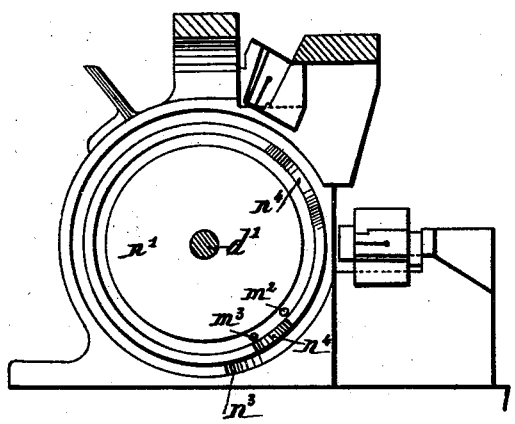
FIG. 6.
FIG. 7.
FIG. 8.
FIG. 12.
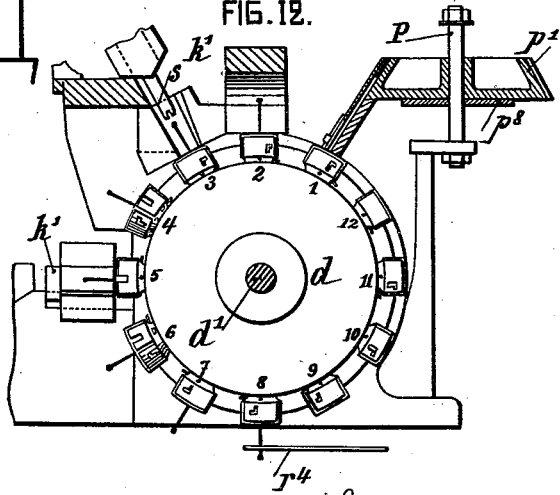
Witnesses:
Inventor
Joseph M. Laughlin,
By Briesen & Knauth
his Attorneys.
THE NATIONAL LITHOGRAPHING COMPANY,
WASHINGTON, D. C.

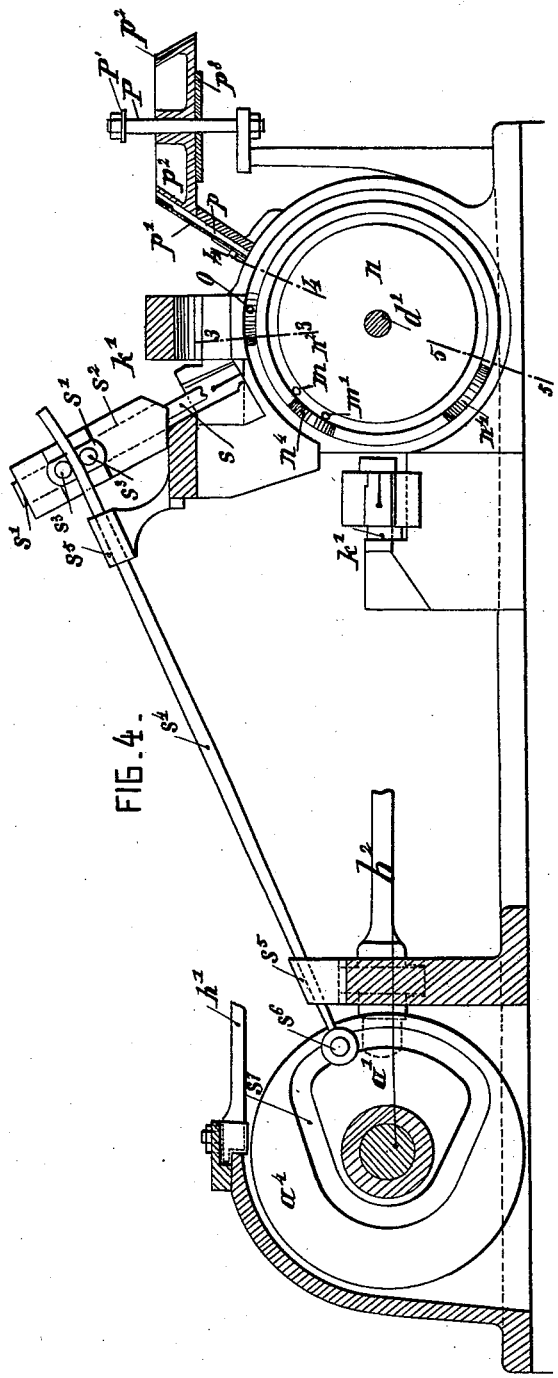

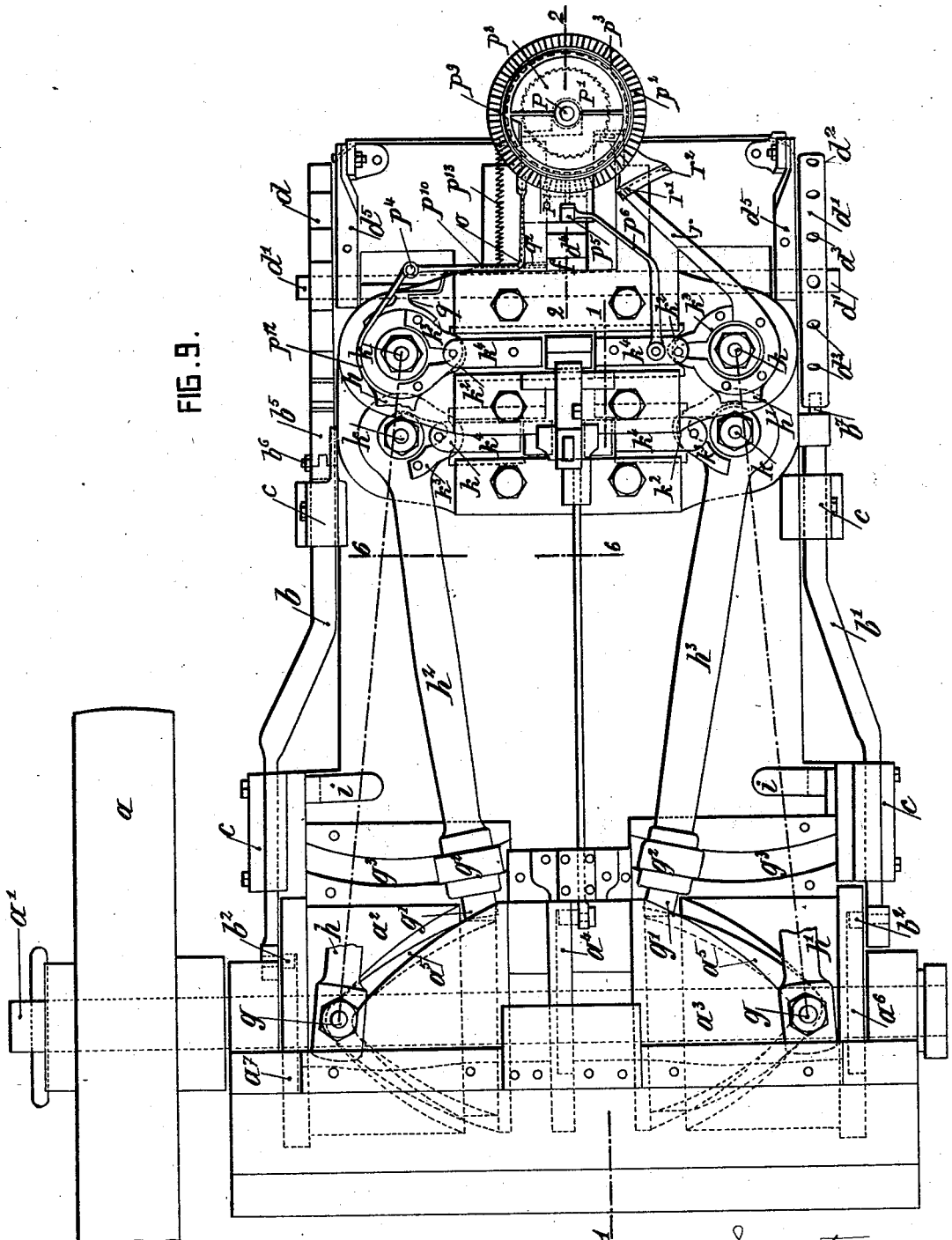

(No Model.) 8 Sheets—Sheet 6.
J. M. LAUGHLIN.
MACHINE FOR PREPARING AND FINISHING NAILS.
No. 521,242. Patented June 12, 1894.

(No Model.)  8 Sheets—Sheet 7.
J. M. LAUGHLIN.
MACHINE FOR PREPARING AND FINISHING NAILS.
No. 521,242. Patented June 12, 1894.
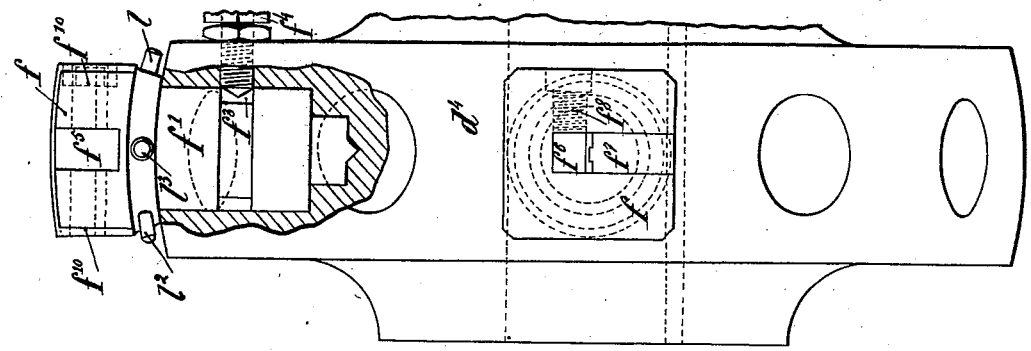
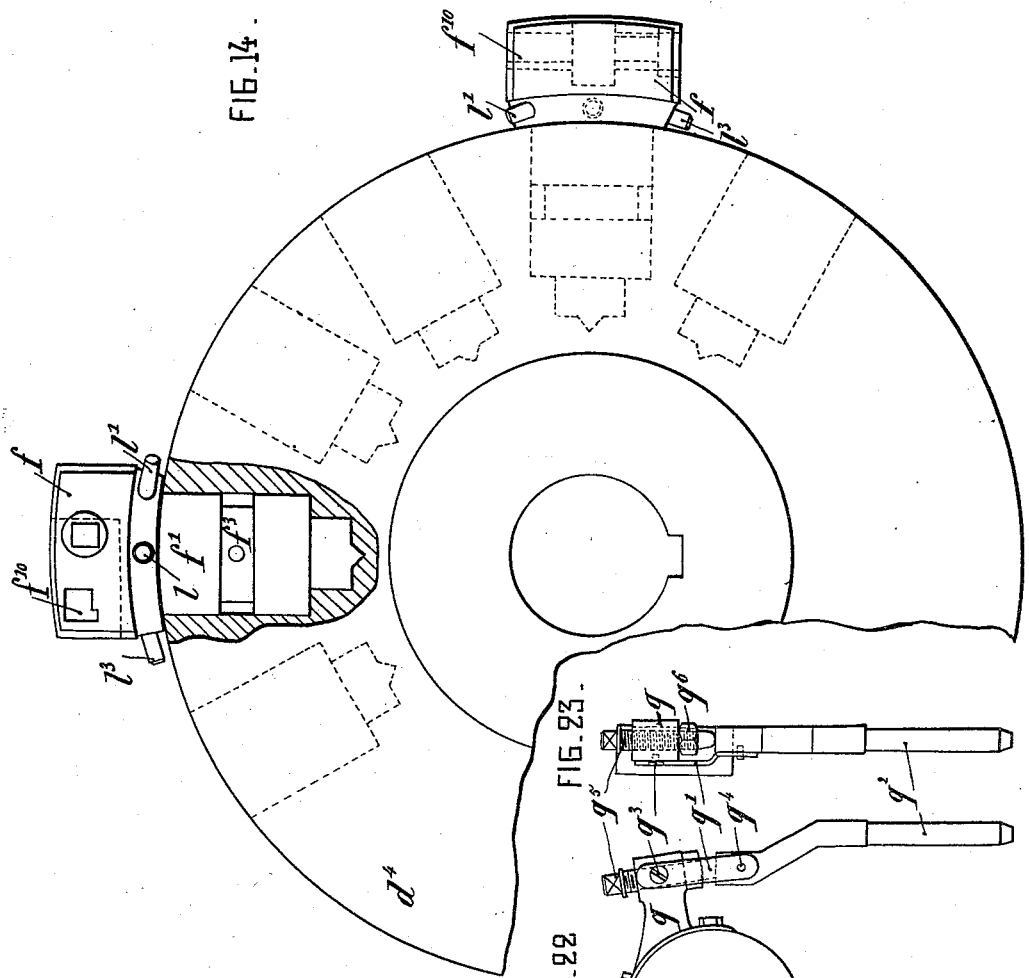
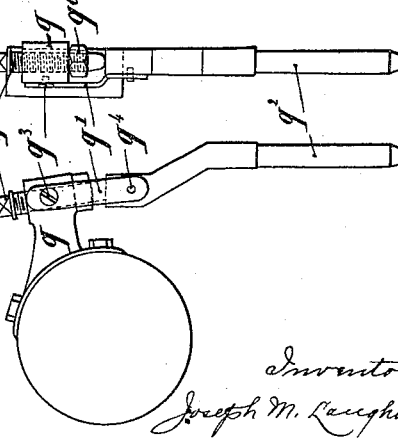
Witnesses:
L. M. Wachschlager
Geo. E. Morse
Inventor
Joseph M. Laughlin
By Bresser & Knauth
his Attorneys.

(No Model.)　　　　　　　　　　　　　　　8 Sheets—Sheet 8.
J. M. LAUGHLIN.
MACHINE FOR PREPARING AND FINISHING NAILS.
No. 521,242.　　　　　　　　Patented June 12, 1894.
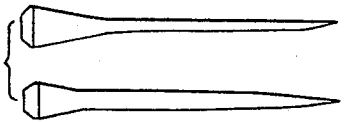
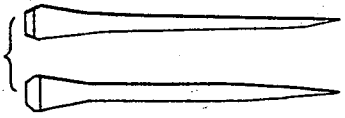
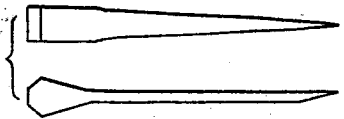
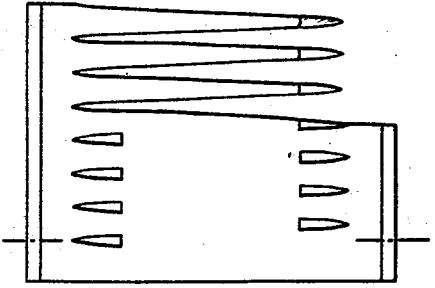
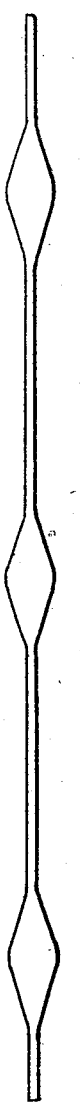
Witnesses:　　　　　　　　　　　　　Inventor
　　　　　　　　　　　　　　Joseph M. Laughlin,
　　　　　　　　　　　　　By Briesen & Knauth
　　　　　　　　　　　　　　　his Attorneys.

UNITED STATES PATENT OFFICE.

JOSEPH MICHAEL LAUGHLIN, OF PARIS, FRANCE.

MACHINE FOR PREPARING AND FINISHING NAILS.

SPECIFICATION forming part of Letters Patent No. 521,242, dated June 12, 1894.

Application filed January 6, 1894. Serial No. 495,956. (No model.)

*To all whom it may concern:*

Be it known that I, JOSEPH MICHAEL LAUGHLIN, of the city of Paris, France, have invented a Machine for Preparing and Finishing Nails of All Kinds, and more particularly Horseshoe-Nails, by Compression, without any waste of material, of which the following is a full, clear, and exact description.

This invention relates to a machine for economically preparing and finishing all kinds of nails and especially horse-shoe nails, produced without any waste of material by stamping or any other suitable operation from a plate or strip of iron or soft steel of suitable profile.

The machine is designed to finish the nail after it has been pointed but of which the head and shank are only roughly shaped and also to complete the sharpening of the point. For this purpose the nail is compressed on its two sides and two faces between dies, the sharpening and the straightening of the point being obtained by the compressing of said point between the dies of the block which holds the nail, as will be hereinafter described.

Reference is to be had to the accompanying drawings, forming part of this specification, wherein—

Figure 1:
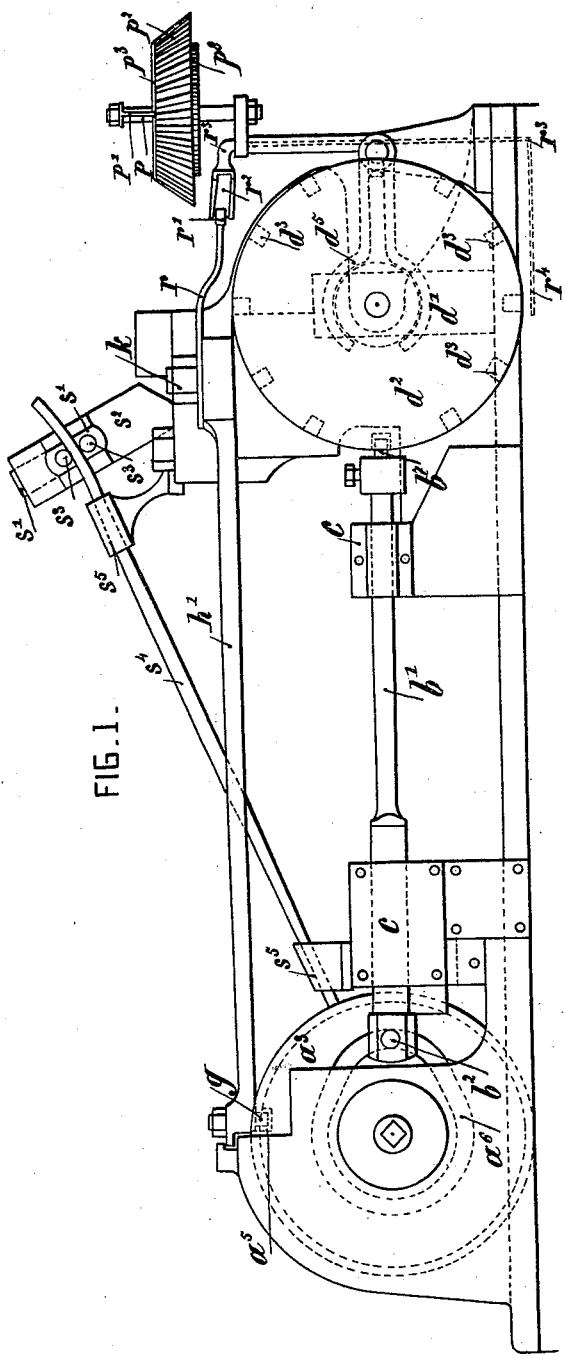
Figure 2:
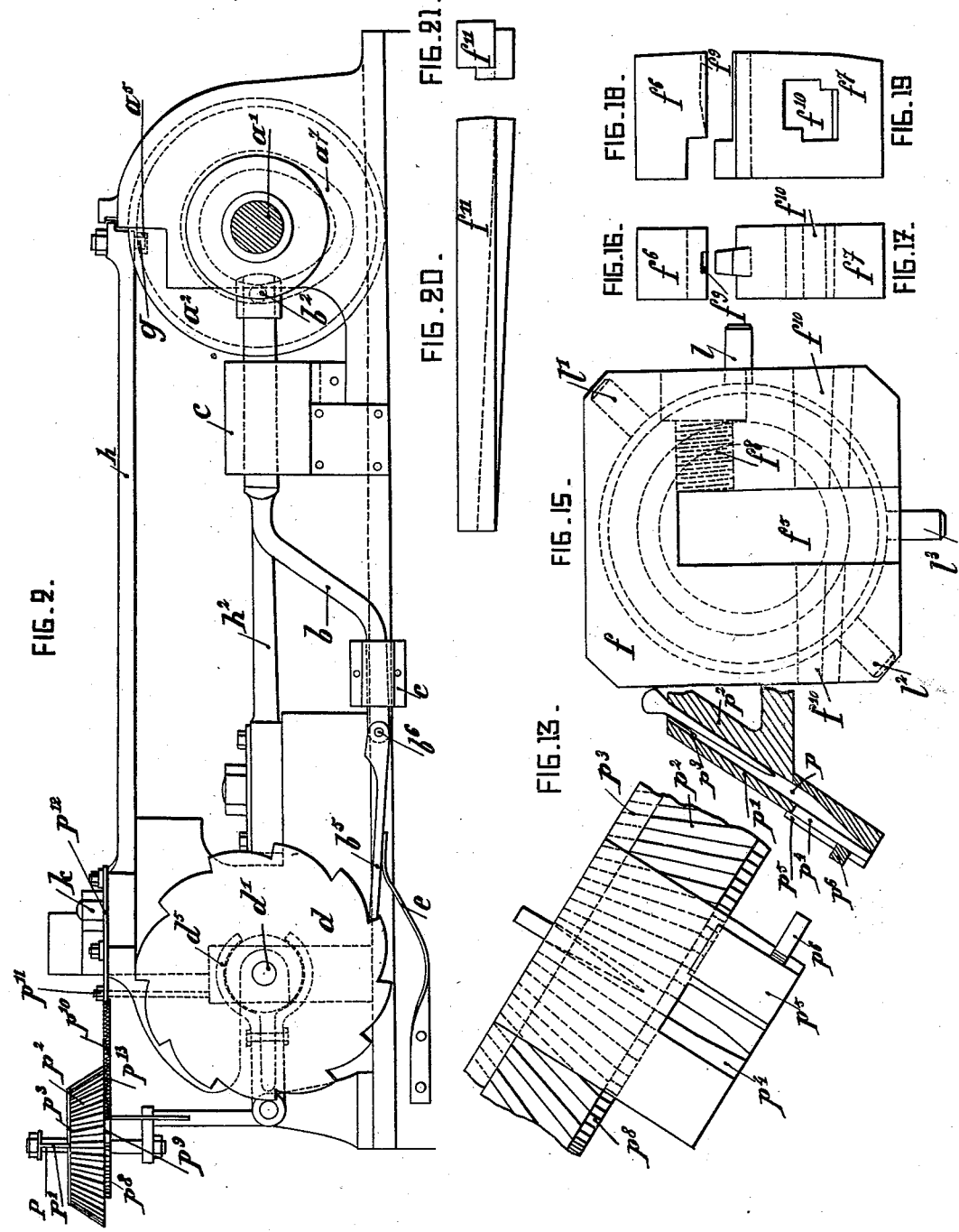
Figure 10:
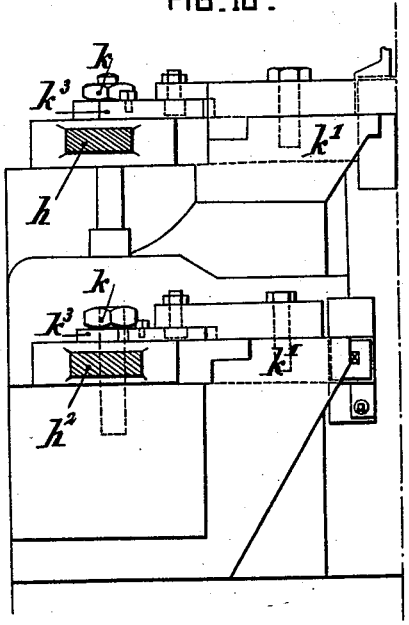
Figure 11:
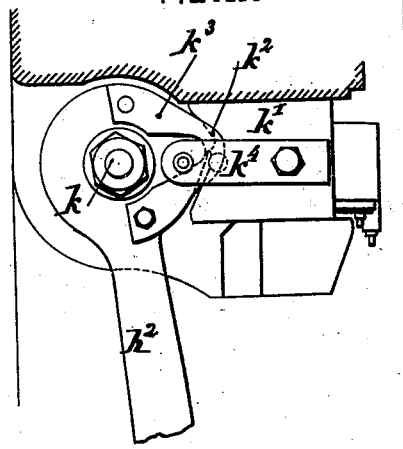

Figures 1 and 2 represent opposite side views of my improved nail-making machine, and Fig. 3 an end view of the same, the flywheel being removed in Fig. 2. Fig. 4 is a longitudinal section on lines 1—2, Fig. 9, the wheel which carries the die-holding blocks being removed to show the right-hand cheekplate. Fig. 5, is a longitudinal sectional detail showing the left-hand cheek-plate. Figs. 6, 7, and 8 are transverse sectional detail views on lines 3—3, 4—4, and 5—5, of Fig. 4, respectively. Fig. 9 is a plan of the machine. Fig. 10 is a transverse sectional detail on line 6—6, of Fig. 9, showing one of the die operating devices, and Fig. 11 is a plan of same. Fig. 12, is a longitudinal section showing the general arrangement, of the die-holding blocks. Fig. 13, is a detail face view of the device for conducting the nail from the distributer to the die-holding blocks upon their revolving carrier. Fig. 13$^a$ is a detail sectional view of the same. Fig. 14, is a detail side-view partly in section of the block-carrying disk, also showing the means employed for fixing the blocks thereto. Fig. 14$^a$ is a face view of the same. Figs. 15, 16, 17, 18 and 19 show details of one of the die-holding blocks. 0 and 21 show a side elevation and an end view respectively of a key or fastener. Figs. 22 and 23 show a side elevation and plan of the device used for forcing the key into the dieholding block. Fig. 24 shows the plate from which the blanks are cut out. Fig. 25 shows the section of the plate. Fig. 26 represents the blank obtained from the plate. Fig. 27 shows a view of the blank after it has been acted upon by the first pair of dies. Fig. 28 shows a completely finished nail after it has been compressed by the other pair of dies. Fig. 29 represents a plan view of a modified form of metal strip from which blanks may be obtained. Fig. 30 shows a side view of the same and Fig. 31 represents a blank obtained from this strip. Fig. 32 represents a side-view of another shaped strip.

My invention consists in the machine for obtaining without any waste of material, blanks for nails of any kind or shape, and more particularly horse-shoe nails, by stamping, cutting or otherwise forming said blanks from a plate or strip of rolled iron or soft steel (Figs. 24, 25, 29, 30, and 32) and afterward finishing said blanks. These blanks will be shaped as shown in Fig. 26, if the plate, Fig. 24 is used, while they will be shaped as in Fig. 31, if cut out from the strip shown in Fig. 29. Fig. 32 will give a blank very nearly similar to that (Fig. 26) given by the plate. The blank is converted into a completely finished nail by the action of my new machine which gives it its final shape, by compression only and without any waste of material.

This machine is driven by a fly wheel $a$, (Fig. 9,) keyed upon shaft $a'$ upon which are also keyed two cam drums $a^2$, $a^3$, and a cam disk $a^4$. The drums $a^2$, $a^3$, have on their circumference a semi-circular helical cam groove $a^5$, as shown in Fig. 9, and on their outer ends cam grooves, $a^6$, $a^7$, (Figs. 1, 2, and 9.) Rods $b$, $b'$, carry friction rollers $b^2$, $b^3$, which engage in the grooves, $a^6$, $a^7$, whereby said rods are reciprocated in guides $c$ by the rotation of shaft $a'$. To one end of the rod $b$ a pawl $b^5$ is pivoted at $b^6$ (Fig. 2) which is pressed by a spring $e$ into engagement with and rotates a ratchet wheel $d$ keyed on a shaft $d'$. Upon the opposite end of shaft $d'$ is keyed a disk $d^2$ having peripheral equidistant recesses $d^3$ and equal in number to that of the teeth of ratchet wheel $d$. The stud $b^7$ on the end of the rod $b'$ enters at each stroke of said rod one of the recesses $d^3$ as it comes opposite thereto, thus regulating the rotation of shaft $d'$ by ratchet wheel $d$.

$d^5$, $d^5$, are clip brakes for stopping the motion of shaft $d'$ at the exact moment the pawl $b^5$ has completed its stroke and has therefore ceased to act upon the ratchet wheel $d$. The brakes $d^5$ are each formed, as shown in Figs. 1, 2 and 9, of a pair of clips between which the shaft $d'$ turns with slight friction. By this means the shaft $d'$ will always be revolved to the same extent at each stroke of rod $b$, the action of the cams $a^6$, $a^7$, being so timed that the stud $b^7$ will only advance for the purpose of entering a recess $d^3$, after rod $b$ has completed its stroke, and shaft $d'$ has been rotated to an extent corresponding to one tooth of the ratchet wheel $d$. Upon shaft $d'$ is also keyed a wheel $d^4$ (Figs. 4, 9 and 14) which carries the blocks $f$ hereinafter described, for forming the points, holding the nails and bringing them opposite the dies.

Of the two pairs of lever arms $h$, $h'$, $h^2$, $h^3$, (Fig. 9), the upper pair $h$, $h'$, are provided at their ends with friction rollers $g$, $g$, and the lower pair $h^2$, $h^3$, with friction rollers $g'$, $g'$, engaging respectively in the circumferential grooves $a^5$ of drums $a^2$, $a^3$. The lower pair of levers $h^2$, $h^3$, also carry friction rollers $g^2$, $g^2$, running in guide grooves $g^3$, $g^3$ and for the purpose of supporting the levers $h^2$, $h^3$, in a horizontal position. The upper pair of levers $h$, $h'$ are supported by the drums while the lower pair of levers $h^2$, $h^3$, are prevented from being carried upward by the drum, with the guides $i$, $i$, Fig. 9. Each lever oscillates freely upon a pivot $k$ and acts by cams $k^2$ $k^3$ upon a sliding die holder $k'$ (Figs. 9, 10, and 11.) The sliding die-holder $k'$ is forced forward by the cam $k^2$, and retracted when the lever moves in the opposite direction, by means of an internal cam $k^3$ or collar attached to cam $k^2$, and engaging a stud on strap $k^4$, fixed to the die-holder. The die-holders $k'$ slide in guide-grooves, in the frame. By the rotation of shaft $a'$ the cam grooves $a^5$ oscillate the pairs of levers $h$, $h'$, and $h^2$, $h^3$, on their pivots $k$ and so move the die-holders $k'$ either toward or away from each other.

The blocks $f$ for holding the nails and sharpening the points are held in the disk $d^4$ by their shanks $f'$ received in peripheral sockets and secured by a set-screw $f^4$ engaging in a circumferential groove $f^3$, as shown in Fig. 14$^a$ so that the blocks are retained, but may turn in their sockets. Each block has one or more recesses, $f^5$; assuming that there is only one recess, as shown in the drawings this recess $f^5$ receives the two-nail-pointing dies $f^6$, $f^7$, separately represented in plan in Figs. 16 and 17 and in elevation in Figs. 18 and 19, the former of which dies is secured by a screw $f^8$ and is provided with a groove $f^9$ for giving the desired form and sharpness to the point of the nail. The block $f$ and die $f^7$ are each formed with a taper mortise $f^{10}$ to receive a key $f^{11}$ whereby the die or dies $f^7$ are secured in the block, the key being of a form in cross-section corresponding with that of the mortise and likewise tapering, as shown separately in Figs. 20 and 21, so that in driving the key through the mortise $f^{10}$ the die or dies $f^7$ will be forced toward the corresponding die or dies $f^6$ so as to clamp between them, the end of the nail or nails. The blocks $f$ have radially projecting pins $l$, $l'$, $l^2$, $l^3$, which are caused to strike against studs $m$, $m'$, $m^2$, $m^3$, (Figs. 4 and 5) for rotating the blocks $f$ in one or other direction. The blocks carried by disk $d^4$ are disposed between two cheeks $n$, $n'$, in the machine framing, the cheek $n$ having a hole $o$ (Fig. 4) for giving passage to a stud hereinafter described, for tightening the key $f^{11}$ in its mortise $f^{10}$ which is effected by a projection $n^2$ formed on the cheek $n$, a similar projection $n^3$ being formed on the other cheek, at a point diametrically opposite thereto, for producing the reverse effect. The studs $m$, $m'$, on cheek $n$ rotate the block $f$ through ninety degrees so that it will present the two other sides of the nail to the lower dies, while similar studs $m^2$ $m^3$ upon cheek $n'$ rotate the block in the opposite direction to return it to its original position.

$n^4$ are slots in the cheeks $n$, $n'$ for permitting of the free rotation of the blocks.

The nail blanks as in Fig. 26 for instance, are first placed in a distributer, consisting of a toothed pinion $p^2$ (Figs. 2, 3, 4, and 9) between the teeth of which they are inserted and retained by a collar $p^3$ received in a recess formed in the teeth and secured in place by a clamp P' upon a vertical spindle P which carries the distributer $p^2$. The nails are fed to each block by a guide chute $p$ fixed to a plate $p'$ screwed to collar $p^3$ which has a gate immediately above the guide, a nail passing freely down by gravity every time one is brought in a line with the guide $p$. The guide $p$ has an aperture $p^4$ at its lower end (see Fig. 13$^a$) which is closed by a shutter $p^5$ mounted on a stem $p^6$ and receiving a sliding motion, as hereinafter described the shutter preventing the nail from falling through the aperture $p^4$. The nail is delivered by the guide $p$ between the dies $f^6$, $f^7$, in the block $f$. A stem $p^6$ (Figs. 3, 9, and 13) is fixed to the part $k^4$ of the upper die holder (see Figs. 9, 10 and 11) and so has the same to and fro movement as the latter. The distributer $p^2$ is rotated from a ratchet wheel $p^8$ engaged by a spring pressed pawl $p^9$ jointed to a bell crank lever $p^{10}$ pivoted on a center $p^{11}$ and terminating in a curved part $p^{12}$ against which one end of the cam $k^3$ on the boss of the upper die-operating lever $h$ abuts when said lever oscillates on its center $k$, thereby oscillating the arm $p^{10}$ about the pivot $p^{11}$ and drawing back the pawl $p^9$ and rotating the distributer $p^2$ to the extent of one tooth of wheel $p^8$, $p^9$ being returned to position by a spiral spring $p^{13}$ when lever $h$ is oscillated in the reverse direction, so as to keep the curved end $p^{12}$ of the bent lever in contact with the cam $k^3$. The pawl $p^9$ is constantly in contact with the toothed wheel $p^8$ by a spring or otherwise. To the boss of lever $h$ is fixed an arm $q$ (Figs. 22 and 23) which acts on a tappet $q^2$ through the medium of a link $q'$ secured to said arm $q$ by a screw $q^3$ and connected to tappet $q^2$ by a pin $q^4$ upon which said tappet pivots.

$q^5$ is a screw-stem which is adjusted by a nut $q^6$ and which passes down through a hole tapped in the arm $q$ and abuts at its end against the end of tappet $q^2$, so that when lever $h$ oscillates in one direction, the arm $q$ will cause the screwed stem $q^5$ to move the tappet forward and on the lever $h$ moving in the opposite direction, the tappet will be drawn back by the link $q'$. The advance movement of the tappet $q^2$ is to drive the key $f^{11}$ forward in the block $f$ and so actuate the movable die $f^7$ or jaw and it occurs whenever a key $f^{11}$ comes opposite the hole $o$ in the cheek $n$ before mentioned.

Upon the boss of the upper lever $h'$ is fixed an arm $r$ (Figs. 1, 3 and 9) having a friction roller $r'$ on its extremity running in a slightly inclined slot $r^2$, so that when lever $h'$ turns on its pivot $k$ the arm $r$ and roller $r'$ will also turn and thus raise or lower the slotted head $r^2$ of the rod $r^3$ terminating at its lower end in a fork $r^4$. When a die-holding block arrives opposite the projection $n^3$ the key $f^{11}$ is forced back, the dies $f^7$ and $f^6$ separate, and the nail which is then engaged by the fork $r^4$ is discharged by the downward movement of the latter, if not already disengaged by its own weight. When a nail is presented between the two upper dies, it is held in the proper position with regard thereto by a presser $s$ fitted to slide in a guide $s^2$ in plate $s'$ and carrying a pair of friction-rollers $s^3$, $s^3$ between which passes a rod $s^4$ mounted in guides $s^5$ and provided at its opposite end with a friction roller $s^6$ running in a cam groove $s^7$ in the end of drum $a^4$, whereby the rod $s^4$ will receive reciprocating motion and owing to its extremity being slightly curved it will in passing between the rollers $s^3$ impart an up and down movement to the presser $s$.

The following is the action of the machine supposing the parts to be in the position represented in the drawings, the upper dies being closed together upon the two sides of the nail presented to them and the lower dies separated and the shutter $p^5$ in front of the aperture $p^4$. If now the fly wheel be turned a quarter revolution, the upper levers $h$, $h'$ will be moved toward each other and the corresponding die-holders $k'$ and dies will be separated, while the lower levers $h^2$, $h^3$, will be moved apart and the dies actuated thereby will be moved together and compress upon two sides and give the finished form to (Fig. 28) the nail which has been previously acted upon by the upper dies as hereinafter more fully described. The ratchet $p^8$ is at the same time caused to rotate one tooth, the shutter $p^5$ will be drawn back to uncover the aperture $p^4$, the arm $r$ will raise the forked extractor, the tappet $q^2$ will move backward, rod $s^4$ will be drawn backward and presser $s$ raised. The side rod $b$ does not move and consequently shaft $d'$ does not turn, and the die-carrying blocks $f$ remain stationary, while the other side rod $b'$ moves backward. On shaft $a$ rotating another fourth of revolution, the upper levers $h$, $h'$ will remain stationary and the lower ones $h^2$, $h^3$, will move toward each other while the corresponding die-carriers $k'$ and dies will move apart and the side rods $b$, $b'$ remain stationary. On the fly wheel rotating a third quarter of a revolution, the upper levers $h$, $h'$ and also the lower ones $h^2$, $h^3$ remain stationary and the side-rod $b$ is moved forward and rotates the ratchet-wheel $d$ one tooth and the shaft $d'$ and the parts mounted thereon a corresponding distance. Each block $f$ is replaced by the next preceding, the block 1 takes the nail which it carries away from guide $p$ and places it opposite the aperture $o$, in order that when the upper levers are about to move apart, the tappet $q^2$ shall strike the key $f^{11}$ in said block and tighten it in the mortise $f^{10}$. The block 2 whose key has already been inserted a certain distance by the action of tappet $q^2$ passes in front of the projection $n^2$ and the key $f^{11}$ being more firmly driven in finally closes the die $f^7$ up toward $f^6$ so as to form the point of the nail, at the same time sharpening it, after which block 2 brings the nail opposite the upper dies. The nail carried by the block 3 has meanwhile been subjected to the action of the two upper dies and received the desired form on its two sides. This block 3 in rotating about the shaft $d'$ abuts against the first stud $m$ which partly turns it, so that it occupies the position of block 4. The second stud $m'$ completes the rotation of block 4 which presents the two other faces of the nail to the two lower dies. The block 5 carrying the nail which has been acted on by the lower dies and which is now perfectly finished, strikes the stud $m^2$ on the cheek $n'$ which commences to rotate it in the reverse direction the block then occupying the place of block 6 where its rotation is completed by the action of stud $m^3$. The key of block 7 is forced back by the projection $n^3$, so as to separate the dies $f^6$, $f^7$ and the nail being no longer retained is received between the limbs of the extractor fork. As for the other blocks 8, 9, 10, 11 they each advance one step, so that block 12 occupies the place of No. 1 and so on for the others. When the fly-wheel completes the last quarter of its revolution, the rod $b'$ moves forward and its nose $b^7$ engages in the recess $d^3$ facing it, in order to so regulate the position of the blocks that they may be brought exactly opposite the parts which act upon them or upon the nails which they carry. The rod $b$, at the same time moves backward, rod $s^4$ advances and brings down the presser $s$ upon the head of the nail, so as to hold it exactly opposite the upper dies, the lower levers remain stationary and the upper levers separate, and the corresponding die-holders $k'$ and dies are brought together and compress on two sides the blank shown in Fig. 26 so as to give it the desired shape as shown in Fig. 27. The pawl $p^9$ is drawn backward and rotates the ratchet wheel $p^8$ one tooth, causing the nail which is presented above the guide-chute $p$ to fall through the gate in the collar at this point and enter between the dies $f^6, f^7$, in the block beneath it, the nail being prevented from falling forward, as before explained, by the shutter $p^5$ which by the movement of the die-holder $k'$ produced by the lever $h'$ is slid over the aperture $p^4$. The extractor $r'$ before mentioned as operated by arm $r$ fixed on the lever $h'$ is moved downward and removes the nail brought into its path from the block in which it was contained if the nail has not already disengaged by its own weight. The same series of operations are repeated in the same order and so on.

The action of the machine may be thus summarized:—Supposing both the upper and lower dies to be separated, if the fly-wheel $a$ makes a quarter-turn, the series of die-holding blocks will turn one twelfth of a circle. At the next quarter-turn of the fly-wheel, the position of each block is regulated by the locking of disk $d^2$ by rod $b'$ the presser $s$ holding the blank nail (Fig. 26 for instance) while it is undergoing the action of the upper dies on two opposite sides so as to arrive at the shape or form shown in Fig. 27. At the third quarter-turn the upper dies separate and then the lower dies compress the nail on the two sides presented to them, in order to finish the nail, as shown in Fig. 28. At the fourth quarter-turn the lower dies separate.

By means of this invention a nail is produced of superior quality and of great strength, owing to the compression to which it is subjected in giving it the desired form.

I claim—

1. In a nail making machine the combination of an intermittently revolving disk, point forming and nail carrying dies carried by said disk, and shank pressing dies, with means for operating the same, all arranged so that the nails are fed in succession from a distributer to the nail carrying dies and by which the nails are presented successively to the action of two pairs of shank-pressing dies of which the first pair compress the nail upon two flanks and the other pair upon its two faces, as specified.

2. In the herein described machine, the combination of combined nail carrying and point pressing dies, a transverse sliding taper-key actuating one of said dies, and means substantially as described for automatically operating said taper-key, as and for the purpose specified.

3. In the herein described machine, the combination of suitably operated combined nail carrying and point pressing dies, and independent dies for pressing the body of the nail upon four sides, whereby a nail can be formed without the loss of material, substantially as specified.

4. In a machine of the kind described, the combination of a rotary distributer, a nail carrying device, a chute interposed between said distributer and nail carrying device, and a movable shutter adapted to be withdrawn from the path of the nail when it is engaged by the nail carrying device, substantially as and for the purposes specified.

5. In the herein described machine, the combination of a series of rotating nail-pointing and carrying dies mounted upon a rotary wheel or drum, means for automatically rotating the nail-pointing and carrying dies independent of the drum on which they are mounted, and independent dies for pressing the body of the nail, whereby the point of the nail is pressed and different sides of the nail alternately presented to the presses which form the body portion of the nail dies, substantially as described and for the purposes specified.

6. In a nail making machine, the combination of a nail distributer, combined point pressing and nail carrying dies, a chute interposed between said nail distributer and the point pressing and nail carrying dies, independent dies for pressing the body portion of the nail and an extractor for dislodging the nail from said combined point pressing and nail carrying dies, all arranged substantially as described.

The foregoing specification of my process and machine for preparing and finishing nails of all kinds, and more particularly horseshoe-nails, by compression, without any waste of material, signed by me this 17th day of November, 1893.

JOSEPH MICHAEL LAUGHLIN.

Witnesses:
CLYDE SHROPSHIRE,
ALBERT MOREAU.